US005891956A

United States Patent [19]
Smith et al.

[11] Patent Number: 5,891,956
[45] Date of Patent: *Apr. 6, 1999

[54] WATER-SOLUBLE POLYMERS AND COMPOSITIONS THEREOF

[75] Inventors: Barbara F. Smith; Thomas W. Robison; Joel W. Gohdes, all of Los Alamos, N. Mex.

[73] Assignee: The Regents of the University of California, Office of Technology Transfer, Alameda, Calif.

[*] Notice: The terminal 10 months of this patent has been disclaimed.

[21] Appl. No.: 454,451

[22] Filed: May 30, 1995

[51] Int. Cl.$^6$ .................................................. C08F 283/00
[52] U.S. Cl. ................................. 525/56; 525/58; 525/61; 525/185; 525/188; 525/189; 525/190; 525/191; 525/192; 525/194; 525/196; 525/203; 525/204; 525/205; 525/217; 525/218; 525/231; 525/326.6; 525/326.7; 525/326.9; 525/327.1; 525/328.2; 525/328.4; 525/328.8; 525/328.9; 525/340; 525/341; 525/343; 525/344; 525/346; 525/347; 525/348; 525/349; 525/351; 525/352; 525/353; 525/360; 525/361; 525/362; 525/363; 525/366; 525/367; 525/370; 525/371; 525/374; 525/375; 525/376; 525/379; 525/380; 525/381; 525/382; 525/383; 525/384; 525/385; 525/386; 525/389; 525/540; 525/186; 525/329.4; 525/355; 525/359.1; 525/395.2; 525/395.3; 525/359.4; 525/359.5; 525/359.6

[58] Field of Search .............................. 525/185, 56, 58, 525/61, 188, 189, 190, 191, 192, 194, 196, 203, 204, 205, 217, 218, 231, 326.6, 326.7, 326.9, 327.1, 328.2, 328.4, 328.8, 328.9, 340, 341, 344, 343, 346, 357, 348, 349, 351, 352, 353, 360, 361, 362, 363, 366, 367, 370, 371, 374, 375, 376, 379, 380, 381, 382, 383, 384, 385, 386, 389, 540, 186, 329.4, 355; 525/359.1, 359.2, 359.3, 359.4, 359.5, 359.6

[56] References Cited

U.S. PATENT DOCUMENTS

| | | | |
|---|---|---|---|
| 3,932,363 | 1/1976 | Lehmann et al. | 260/78 |
| 4,251,597 | 2/1981 | Emmons et al. | 428/500 |
| 4,650,522 | 3/1987 | Teraji et al. | 106/314 |
| 4,650,846 | 3/1987 | Herweh | 526/268 |
| 4,741,831 | 5/1988 | Grinstead | 210/638 |
| 4,977,239 | 12/1990 | Kamutzki et al. | 528/310 |
| 5,347,071 | 9/1994 | Moriya et al. | 588/256 |
| 5,387,365 | 2/1995 | Moriya et al. | 252/180 |
| 5,395,896 | 3/1995 | Moriya et al. | 525/328.2 |

FOREIGN PATENT DOCUMENTS

| | | | |
|---|---|---|---|
| 0437851A1 | 12/1990 | European Pat. Off. | B01J 45/00 |
| 1466150 | 12/1973 | United Kingdom | B01D 13/00 |

OTHER PUBLICATIONS

Geckler et al., "Removal of Hazardous Substances from Water using Ultraltration in Conjunction with Soluble Polymers", Environmental Science & Technology, vol. 30, No. 3, pp. 725–734 (1996).

Geckler et al., "Preparation and Application of Water–Soluble Polymer–Metal Complexes", Pure & Applied Chem., vol. 52, pp. 1883–1905 (1980).

Volchek et al., "Polymer binding/ultrafiltration as a method for concentration and separation of metals", J. of Membrane Sci., vol. 79, pp. 253–272 (1993).

H. Strathmann, "Selective Removal of Heavy Metal Ions from Aqueous Solutions by Diafiltration of Macromolecular Complexes", Separation Science & Technology, 15(4), 1980, pp. 1135–1152.

E. Bayer et al., "Soluble Polychelatogenes for Separation of Actinide Ions by Membrane Filtration", Israel Journal of Chemistry, 1985, vol. 26, pp. 40–47.

S. Kobayashi et al., Phosphonomethylated Polyethylenimine Resin for Recovery of Uranium from Seawater, Polymer Bulletin, 1986, vol. 15, pp. 7–12.

K. E. Geckeler et al., Liquid–Phase Polymer–Based Retention, A New Method for Separation and Preconcentration of Elements, Analytica Chimica Acta, 1986, pp. 285–292.

V. A. Kichik et al., Method for Reprocessing Liquid Radioactive Wastes, Combining Selective Complexing and Ultrafiltration, translation from Atomnaya Energiya, vol. 58, No. 4, pp. 272–273 (Apr. 1985) by Plenum Publishing Corporation, 1985, pp. 315–317.

Ye. Ye. Yergozhin et al., 8–hydroxyquinoline–Based, Soluble, and Chelate Forming Ion Exchangers and Some of Their Physical and Chemical Properties, Polymer Science U.S.S.R. vol. 21, pp. 2225–21233 (1980).

B. Y. Spivakov et al., Liquid–phase Polymer–Based Retention–the Separation of Metals by Ultrafiltration on Polychelatogens, Nature, 1985, vol. 315, pp. 313–315.

V. M. Shkinev et al., Determination of Trace Heavy Metals in Water by Atomic–Absorption Spectrometry after Preconcentration by Liquid–Phase Polymer–Based Retention, Talanta, 1989, vol. 36, No. 8, pp. 861–863.

B. Chaufer et al., Removal of Metal Ions by Complexation–Ultrafiltration Using Water–Soluble Macromolecules, Nuclear and Chemical Waste Management, 1988, vol. 8, pp. 178–187.

M. Rumeau et al., Separation by Coupling Ultrafiltration and Complexation of Metallic Species with Industrial Water Soluble Polymers, Journal of Membrane Science, 1992, vol. 73, pp. 313–322.

(List continued on next page.)

*Primary Examiner*—Frederick Krass
*Attorney, Agent, or Firm*—Bruce H. Cottrell

[57] ABSTRACT

Water-soluble polymers including functionalization from the group of amino groups, carboxylic acid groups, phosphonic acid groups, phosphonic ester groups, acylpyrazolone groups, hydroxamic acid groups, aza crown ether groups, oxy crown ethers groups, guanidinium groups, amide groups, ester groups, aminodicarboxylic groups, permethylated polyvinylpyridine groups, permethylated amine groups, mercaptosuccinic acid groups, alkyl thiol groups, and N-alkylthiourea groups are disclosed.

21 Claims, No Drawings

OTHER PUBLICATIONS

L. P. Buckley et al., Selective Removal of Dissolved Toxic Metals from Groundwater by Ultrafiltration in Combination with Chemical Treatment, Paper at HAZTECH International 89 Conference, Cincinnati, Ohio, Sep. 12–14, 1989.

V. T. Le et al., Selective Removal of Dissolved Radioactivity from Aqueous Wastes by a Chemical Treatment/Ultrafiltration Technique, Paper No. S10b at International Conference on Separation Science and Technology, Hamilton, Canada, Oct. 1–4, 1989.

L. P. Buckley et al., The Removal of Soluble Toxic Metals from Water, paper at Annual Environmental Protection Agency (EPA) research symposium, Cincinnati, Ohio, Apr. 3–5, 1990.

EPA Technology Profile, "Atomic Energy of Canada LTD", Superfund Innovative Technology Evaluation, Nov. 1988, pp. 69–70.

WATER-SOLUBLE POLYMERS AND COMPOSITIONS THEREOF

This invention is the result of a contract with the United States Department of Energy (Contract No. W-7405-ENG-36).

FIELD OF THE INVENTION

The present invention relates to water-soluble polymers and compositions thereof, such water-soluble polymers and compositions thereof useful, e.g., in processes for selective separation of metal ions from aqueous streams, and processes for the selective separation of metals from solid matrixes.

BACKGROUND OF THE INVENTION

Water-soluble polymers are well known for the retention or recovery of certain metal ions from solutions under certain conditions, e.g., certain pH conditions (see, e.g., Pure and Applied Chemistry. Vol. 52, pp. 1883–1905 (1980), Talanta, vol. 36, No. 8, pp. 861–863 (1989), and U.S. Pat. No. 4,741,831). Additionally, higher molecular weight varieties of the water-soluble polymers such as polyethyleneimine have been used as coatings on, e.g. silica gel, for separation and recovery of metal ions. However, the selectivity of the polymer for target metals due to competition from competing or interfering ions within solutions can present unique challenges.

It is an object of the present invention to provide novel water-soluble polymers.

It is a further object of the invention to provide compositions of water-soluble polymers having defined molecular weight ranges.

Still another object of the present invention is to provide compositions of water-soluble polymers including at least two different water-soluble polymers, the different water-soluble polymers differing in functionality, molecular weight range or both.

SUMMARY OF THE INVENTION

To achieve the foregoing and other objects, and in accordance with the purposes of the present invention, as embodied and broadly described herein, the present invention provides a water soluble polymer of the formula $$-(CH_2-CH_2-N-CH_2-CH_2NX_1)_n- \quad \text{(i)}$$
$$| $$
$$CH_2-CH_2NX_2X_3$$

wherein $X_1$, $X_2$, and $X_3$ in each unit of the polymer is a group independently selected from a substituent selected from H, $C(O)CH_2CH(SH)COOH$, $$-(CH_2)_mYZ_p$$

where when m is an integer selected from 0, 2, 3, and 4, Y is selected from C=O, P=O, C=S, $SO_2$, $C(O)CH_2C(O)$, and S, Z is selected from an amine, alkylamine, arylamine, hydroxyl, oxyalkyl, oxyaryl, hydroxylamine, alkylhydroxylamine, arylhydroxylamine, thiol, alkylthiol, alkyl, aryl, dimethylpyrazolone, methylphenylpyrazolone, dimethylpyrazol-thione, methylphenylpyrazol-thione, oxycrown ethers, azacrown ethers, thiocrown ethers, and H, and when m is 1, Y is selected from C=O, C=S, $SO_2$, C(O)$CH_2$C(O), and S, Z is selected from an amine, alkylamine, arylamine, oxyalkyl, oxyaryl, hydroxylamine, alkylhydroxylamine, arylhydroxylamine, thiol, alkylthiol, alkyl, aryl, dimethylpyrazolone, methylphenylpyrazolone, dimethylpyrazol-thione, methylphenylpyrazol-thione, oxycrown ethers, azacrown ethers, thiocrown ethers, and H, p is an integer from 1 to 2, and n is an integer between about 12 and 12,000; or $$\begin{array}{c} | \\ (CH_2)_m \\ | \\ (R_1)_pYCHY(R_2)_p \end{array}$$

where m is an integer from 0 to 6, Y is selected from C=O, P=O, and C=S, $R_1$ and $R_2$ are selected from an amine, alkylamine, arylamine, hydroxyl, oxyalkyl, oxyaryl, hydroxylamine, alkylhydroxylamine, arylhydroxylamine, thiol, alkylthiol, alkyl, aryl, and H, p is an integer from 1 to 2, and n is an integer between about 12 and 12,000 with the proviso that at least one of $X_1$, $X_2$, and $X_3$ is not hydrogen;

$$-(CH_2-CH_2)_n- \quad \text{(ii)}$$
$$| $$
$$(CH_2)_q-NX_4X_5$$

wherein $X_4$ and $X_5$ in each unit of the polymer is a group independently selected from a substituent selected from H, $C(O)CH_2CH(SH)COOH$, $$-(CH_2)_mYZ_p$$

where q is an integer from 0 to 4, and where when m is an integer selected from 0, 2, 3, and 4, Y is selected from C=O, P=O, C=S, $SO_2$, $C(O)CH_2C(O)$, and S, Z is selected from an amine, alkylamine, arylamine, hydroxyl, oxyalkyl, oxyaryl, hydroxylamine, alkylhydroxylamine, arylhydroxylamine, thiol, alkylthiol, alkyl, aryl, dimethylpyrazolone, methylphenylpyrazolone, dimethylpyrazol-thione, methylphenylpyrazol-thione, oxycrown ethers, azacrown ethers, thiocrown ethers, and H, and when m is 1, Y is selected from C=O, C=S, $SO_2$, C(O)$CH_2$C(O), and S, Z is selected from an amine, alkylamine, arylamine, oxyalkyl, oxyaryl, hydroxylamine, alkylhydroxylamine, arylhydroxylamine, thiol, alkylthiol, alkyl, aryl, dimethylpyrazolone, methylphenylpyrazolone, dimethylpyrazol-thione, methylphenylpyrazol-thione, oxycrown ethers, azacrown ethers, thiocrown ethers, and H, p is an integer from 1 to 2, and n is an integer between about 24 and 24,000 with the proviso that at least one of $X_4$ and $X_5$ is not hydrogen;

$$-(CH_2-CH)_n- \quad \text{(iii)}$$
$$| $$
$$OX_6$$

wherein $X_6$ in each unit of the polymer is a group independently selected from a substituent selected from $C(O)CH_2CH(SH)COOH$, $$-(CH_2)_mYZ_p$$

where m is an integer selected from 0, 2, 3, and 4, Y is selected from C=O, P=O, C=S, $SO_2$, $C(O)CH_2C(O)$, and S, Z is selected from an amine, alkylamine, arylamine, hydroxyl, oxyalkyl, oxyaryl, hydroxylamine, alkylhydroxylamine, arylhydroxylamine, thiol, alkylthiol, alkyl, aryl, dimethylpyrazolone, methylphenylpyrazolone, dimethylpyrazol-thione, methylphenylpyrazol-thione, oxycrown ethers, azacrown ethers, thiocrown ethers, and H, and when m is 1, Y is selected from C=O, C=S, $SO_2$, C(O)

$CH_2C(O)$, and S, Z is selected from an amine, alkylamine, arylamine, oxyalkyl, oxyaryl, hydroxylamine, alkylhydroxylamine, arylhydroxylamine, thiol, alkylthiol, alkyl, aryl, dimethylpyrazolone, methylphenylpyrazolone, dimethylpyrazol-thione, methylphenylpyrazol-thione, oxy-crown ethers, azacrown ethers, thiocrown ethers, and H, p is an integer from 1 to 2, and n is an integer between about 24 and 24,000;

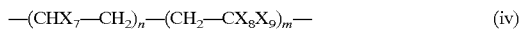  (iv)

wherein $X_7$ and $X_8$, and $X_9$ in each unit of the polymer is a group independently selected from a substituent selected from $C(O)CH_2CH(SH)COOH$,

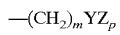

where m is an integer selected from 0, 2, and 4, Y is selected from $C=O$, $P=O$, $C=S$, $SO_2$, $C(O)CH_2C(O)$, and S, Z is selected from an amine, alkylamine, arylamine, hydroxyl, oxyalkyl, oxyaryl, hydroxylamine, alkylhydroxylamine, arylhydroxylamine, thiol, alkylthiol, alkyl, aryl, dimethylpyrazolone, methylphenylpyrazolone, dimethylpyrazol-thione, methylphenylpyrazol-thione, oxy-crown ethers, azacrown ethers, thiocrown ethers, and H, and when m is 1, Y is selected from $C=O$, $C=S$, $SO_2$, $C(O)CH_2C(O)$, and S, Z is selected from an amine, alkylamine, arylamine, oxyalkyl, oxyaryl, hydroxylamine, alkylhydroxylamine, arylhydroxylamine, thiol, alkylthiol, alkyl, aryl, dimethylpyrazolone, methylphenylpyrazolone, dimethylpyrazol-thione, methylphenylpyrazol-thione, oxy-crown ethers, azacrown ethers, thiocrown ethers, and H, p is an integer from 1 to 2, and n is an integer between about 12 and 12,000, or

  (v)

wherein $X_{10}$ and $X_{11}$ in each unit of the polymer are a thiolactum or are a group independently selected from a substituent selected from $C(O)CH_2CH(SH)COOH$, and

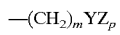

where m is an integer from 0 to 4, Y is selected from $C=O$, $P=O$, $C=S$, $SO_2$, $C(O)CH_2C(O)$, and S; Z is selected from an amine, alkylamine, arylamine, hydroxyl, oxyalkyl, oxyaryl, hydroxylamine, alkylhydroxylamine, arylhydroxylamine, thiol, alkylthiol, alkyl, aryl, dimethylpyrazolone, methylphenylpyrazolone, dimethylpyrazol-thione, methylphenylpyrazol-thione, oxy-crown ethers, azacrown ethers, thiocrown ethers, and H, p is an integer from 1 to 2, and n is an integer between about 24 and 24,000.

The present invention also provides a water soluble polymer of the formula

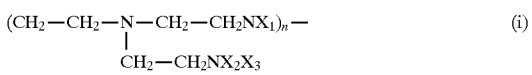  (i)

wherein $X_1$, $X_2$, and $X_3$ in each unit of the polymer is a group independently selected from a substituent selected from H, $C(O)CH_2CH(SH)COOH$,

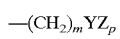

where m is an integer from 0 to 4, Y is selected from $C=O$, $P=O$, $C=S$, $SO_2$, $C(O)CH_2C(O)$, and S, Z is selected from an amine, alkylamine, arylamine, hydroxyl, oxyalkyl, oxyaryl, hydroxylamine, alkylhydroxylamine, arylhydroxylamine, thiol, alkylthiol, alkyl, aryl, dimethylpyrazolone, methylphenylpyrazolone, dimethylpyrazol-thione, methylphenylpyrazol-thione, oxy-crown ethers, azacrown ethers, thiocrown ethers, and H, p is an integer from 1 to 2, and n is an integer between about 12 and 12,000;

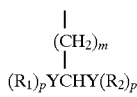

where m is an integer from 0 to 6, Y is selected from $C=O$, $P=O$, and $C=S$, $R_1$ and $R_2$ are selected from an amine, alkylamine, arylamine, hydroxyl, oxyalkyl, oxyaryl, hydroxylamine, alkylhydroxylamine, arylhydroxylamine, thiol, alkylthiol, alkyl, aryl, and H, p is an integer from 1 to 2, and n is an integer between about 12 and 12,000;

  (ii)

wherein $X_4$ and $X_5$ in each unit of the polymer is a group independently selected from a substituent selected from H, $C(O)CH_2CH(SH)COOH$,

where q is an integer from 0 to 4, m is an integer from 0 to 4, Y is selected from $C=O$, $P=O$, $C=S$, $SO_2$, $C(O)CH_2C(O)$, and S, Z is selected from an amine, alkylamine, arylamine, hydroxyl, oxyalkyl, oxyaryl, hydroxylamine, alkylhydroxylamine, arylhydroxylamine, thiol, alkylthiol, alkyl, aryl, dimethylpyrazolone, methylphenylpyrazolone, dimethylpyrazol-thione, methylphenylpyrazol-thione, oxy-crown ethers, azacrown ethers, thiocrown ethers, and H, p is an integer from 1 to 2, and n is an integer between about 24 and 24,000;

  (iii)

wherein $X_6$ in each unit of the polymer is a group independently selected from a substituent selected from $C(O)CH_2CH(SH)COOH$,

where m is an integer from 0 to 4, Y is selected from $C=O$, $P=O$, $C=S$, $SO_2$, $C(O)CH_2C(O)$, and S; Z is selected from an amine, alkylamine, arylamine, hydroxyl, oxyalkyl, oxyaryl, hydroxylamine, alkylhydroxylamine, arylhydroxylamine, thiol, alkylthiol, alkyl, aryl, dimethylpyrazolone, methylphenylpyrazolone, dimethylpyrazol-thione, methylphenylpyrazol-thione, oxy-crown ethers, azacrown ethers, thiocrown ethers, and H, p is an integer from 1 to 2, and n is an integer between about 24 and 24,000;

  (iv)

wherein $X_7$, $X_8$, and $X_9$ in each unit of the polymer is a group independently selected from a substituent selected from $C(O)CH_2CH(SH)COOH$,

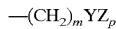

where m is an integer from 0 to 4, Y is selected from C=O, P=O, C=S, SO$_2$, C(O)CH$_2$C(O), and S, Z is selected from an amine, alkylamine, arylamine, hydroxyl, oxyalkyl, oxyaryl, hydroxylamine, alkylhydroxylamine, arylhydroxylamine, thiol, alkylthiol, alkyl, aryl, dimethylpyrazolone, methylphenylpyrazolone, dimethylpyrazol-thione, methylphenylpyrazol-thione, oxycrown ethers, azacrown ethers, thiocrown ethers, and H, p is an integer from 1 to 2, and n is an integer between about 12 and 12,000; or

   (v)

wherein $X_{10}$ and $X_{11}$ in each unit of the polymer are a thiolactum or are a group independently selected from a substituent selected from C(O)CH$_2$CH(SH)COOH, and

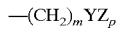

where m is an integer from 0 to 4, Y is selected from C=O, P=O, C=S, SO$_2$, C(O)CH$_2$C(O), and S; Z is selected from an amine, alkylamine, arylamine, hydroxyl, oxyalkyl, oxyaryl, hydroxylamine, alkylhydroxylamine, arylhydroxylamine, thiol, alkylthiol, alkyl, aryl, dimethylpyrazolone, methylphenylpyrazolone, dimethylpyrazol-thione, methylphenylpyrazol-thione, oxycrown ethers, azacrown ethers, thiocrown ethers, and H, p is an integer from 1 to 2, and n is an integer between about 24 and 24,000, said water-soluble polymer having a molecular weight of greater than about 10,000 and further characterized as essentially free of molecular weights less than about 10,000.

In one embodiment of the present invention, a water-soluble polymer is provided having nitrogen-, oxygen- or sulfur-containing groups capable of binding selected metal ions, said water-soluble polymer having a molecular weight of greater than about 30,000 and characterized as essentially free of molecular weights less than about 30,000.

In another embodiment of the invention, the water-soluble polymer includes functionalization from the group of amino groups, carboxylic acid groups, phosphonic acid groups, phosphonic ester groups, acylpyrazolone groups, hydroxamic acid groups, aza crown ether groups, oxy crown ethers groups, guanidinium groups, amide groups, ester groups, aminodicarboxylic groups, permethylated polvinylpyridine groups, permethylated amine groups, mercaptosuccinic acid groups, alkyl thiol groups, and N-alkylthiourea groups.

DETAILED DESCRIPTION

The present invention is concerned with water-soluble polymers, such water-soluble polymers useful, e.g., in the separation of various metals, e.g., toxic metals and/or precious and/or nuisance metals from aqueous streams.

The water-soluble polymers useful in practicing the present invention are synthetic water-soluble polymers, i.e., they are not naturally occurring water-soluble polymers such as starch, cellulose, and the like and do not involve modified naturally occurring water-soluble polymers. The water-soluble polymers used in the present invention generally include a nitrogen-, oxygen-, or sulfur-containing group. Exemplary of the water-soluble polymers used in the present invention are polyalkyleneimines such as polyethyleneimine and modified polyalkyleneimines, i.e., polyalkyleneimines such as polyethyleneimine where the water-soluble polymer includes functionalization selected from the group consisting of carboxylic acid groups, ester groups, amide groups, hydroxamic acid groups, phosphonic acid groups, phosphonic ester groups, acylpyrazolone groups, aza-crown ether groups, oxy-crown ether groups, guanidinium groups, thiolactam groups, catechol groups, mercaptosuccinic acid groups, alkyl thiol groups, and N-alkylthiourea groups. In addition to polyethyleneimine as the basic structure of many of the water-soluble polymers, other water-soluble polymer structures with nitrogen-containing groups such as poly (vinylamine), polyvinylpyridine, poly(acrylamide), and poly (allylamine), can be used. Also, water-soluble polymers structures with oxygen-containing groups such as poly (vinylalcohol) or oxygen- and nitrogen-containing groups such as polyvinylpyrrolidone can be used. The amine backbones can also be permethylated to give permethylpolyethyleneimine, permethylated polyvinylpyridine, permethylated polyallylamine, or permethylated polyvinylamine. Water-soluble polymers can be constructed from vinyl monomer polymerization reactions to give a number of pendent groups, copolymer of acrylamide and bis-phosphonic esters and acids. Water-soluble polymers with metal binding properties can be obtained from ring-opening reactions, e.g., the treatment of polypyrrolidone with base or hydroxylamine.

Exemplary of suitable functionalized water-soluble polymers are the reaction product of polyethyleneimine and an arylalkylhaloacetylpyrazolones such as phenylmethylchloroacetylpyrazolone or dimethylchloroacetylpyrazolone to yield a phenylmethylacetylpyrazolone-substituted or dimethylacetylpyrazolone-substituted polyethyleneimine, the reaction product of polyethyleneimine (polyallylamine, polyvinylamine) and a halocarboxylic acid such as bromoacetic acid or chloroacetic acid to yield an aminocarboxylate-substituted polyethyleneimine (polyallylamine, polyvinylamine), the reaction product of polyethyleneimine (polyvinylamine) and phosphorous acid and formaldehyde to give a phosphonic acid substituted polyethyleneimine (polyvinylamine), the reaction of polyethyleneimine and a monohydroxamic acid of succinic acid to give a hydroxamic acid substituted polyethyleneimine, the reaction of polyethyleneimine with acrylamide or ethylacrylate to give an ester or amide substituted polyethyleneimine, the reaction of vinylalcohol with a crown alcohol to give an oxycrown substituted vinylalcohol, the permethylation of polyvinylpyridine or polyethyleneimine or polyvinylamine or polyallylamine to give the respective permethylated polymers, the ring opening of polypyrrolidone with hydroxylamine to give the hydroxamic acid polymer, the copolymerization of a betabisphosphonic acid or ester with acrylamide to give a copolymer, the reaction of polyethyleneimine with a bisphosphonic acid or ester to give bisphosphonic acid or ester polyethyleneimine, and the reaction product of polyethyleneimine and a haloacetylaza crown material such as a chloroacetylaza crown ether to yield an aza crown ether-substituted polyethyleneimine.

When the polyethyleneimine is functionalized, care must be taken to control the level of functionalization as solubility problems at certain pH values can exist depending upon the type of functional groups and backbone used. The water-soluble polymers used in the present process preferably maintains their water solubility over the entire pH range of, e.g., pH 1 to 14. Preferably, any polyethyleneimine used in the present invention includes primary, secondary and tertiary amines. Bisfunctionalization can be realized for primary nitrogens allowing for multidentate character of some of the chelating groups. The polyethyleneimine is a branched polymer, giving it a globular nature and high charge density which partly accounts for its uniqueness in the polyamine family of polymers. This highly branched character also allows for better chelating site interactions with metal ions within the polymer. Other polyamines, i.e., polyvinylamine and polyallylamine, can be used as backbones, and are composed of all primary nitrogens, but they are linear polymers and if over functionalized can lead to insolubility in different pH ranges.

The use of prepurified (sized) polymer in the functionalization can be preferred in the process. Use of pre-purified polymer, e.g., polyethyleneimine, has the advantage that reagents used in subsequent functionalization steps are not lost on low molecular weight polyethyleneimine that will be lost in subsequent purification of the functionalized polymers. Further, it gives an extra margin of assurity that there will be no polymer leakage during the use of the polymers in any ultrafiltration process.

Conditions in the preparation of the water-soluble polymers can be important to assure that there is no detectable leakage through an ultrafiltration membrane during some subsequent processes. Several factors are important in aiding the presizing of the water-soluble polymers; the polymer concentration the pH value, and the ionic strength at which the polymers are presized are all important. Because water-soluble polymers can aggregate in solution and because the polymers can expand or contract in size, conditions that effects these tendencies should be controlled. For example, it is known that polyethyleneimine can change it average size by 60% between a basic and acidic solution (larger in the acidic solution and smaller in basic). Thus, polyethyleneimine should be prepurified at the pH where its size is smallest to further assure the smaller fragments are remover from the larger fragments (at a pH of about 10–11). Other polymers because of either their neutral, anionic, or cationic nature will have different optimum pH values for prepurifying depending upon the pH that gives the smallest polymeric volume in solution. The ionic strength of a solution can also effect the polymeric volume in solution similarly to pH effects. If polymer concentration are too high in solution they will aggregate, again effecting the potential ability of obtaining polymers that are not going to leak through the membranes during any ultrafiltration process.

The prior art in the preparation of polyethyleneimine or other water-soluble polymers for use in metal separations has been quite vague in how it is prepared and treated for use in ultrafiltration techniques.

The present process to purify polyethyleneimine is unique in that the purification scheme does not clog the ultrafiltration membranes. In contrast, some polyethyleneimine manufacturers have been unable to develop a purification technique for sizing the polymer using ultrafiltration without severely and irreversibly clogging the membranes. Note that one other main use of polyethyleneimine is as an adhesive and polyethyleneimine is known to bind to many surfaces, especially cellulose and anionic surfaces. Polyethyleneimine has been reported to be fractionated by size using GPC (size exclusion chromatography), precipitation, and by exhaustive dialysis. Average molecular weight determinations were performed by osmometry, ultracentrifugation, viscometry, and light scattering techniques. Generally, the literature refers to determining the average molecular weight instead of producing fractions that do not pass an absolute molecular weight cutoff.

The water-soluble polymers of the present invention can be used in several potential compositions for selective separation of metal ions from aqueous streams or metals from solid matrixes. There can be a single polymer that will bind selectively with only one metal ion over all other ions and materials under the conditions of the process. Separation is achieved by binding that metal ion to the water-soluble polymer and then using a separation technique such as ultrafiltration to remove the water and other materials from the polymer. The polymer-bound metal ion is thus concentrated. The polymer-bound metal can be released from the polymer by a variety of processes as shown in the following equations:

$$M(P)+H^+ \rightarrow HP+M^+ \qquad (eq.\ 1)$$

$$M(P)+L \rightarrow ML+(P) \qquad (eq.\ 2)$$

or $$M(P)+e^- \rightarrow M^x+(P) \qquad (eq.\ 3)$$

where M is the metal ion, (P) is the water-soluble polymer, L is a competing complexant, $H^+$ is a proton, x is the valent state of the metal, and $e^-$ is an electron for an oxidation change reaction. Where the metal is released by a proton (eq. 1) or by a competing molecular ligand (eq. 2), the polymer-free metal ion is recovered by a diafiltration process. In some instances, the metal ion may be so tightly bound to the polymer that it is more desirable to heat process the concentrate to destroy the polymer (incineration, hot acid digestion, smelting, etc.) and recover the metal. Optionally, for waste management purposes it may be desirable to solidify the polymer-bound metal, e.g., in a grout or cement material, such that it passes toxic leach tests (TCLP).

Another potential composition can include a single polymer that will bind with a combination of metal ions under the process conditions. Separation and selectivity is realized by binding that combination of metal ions then using a separation technique such as ultrafiltration to remove the water and other materials from the polymer-metal complexes. The polymer-bound metals can be selectively released from the polymer by a variety of processes as shown above in equations 1, 2, and 3. Where the selected metal is released by protons (eq. 1) or by a competing molecular ligand (eq. 2), the polymer-free metal ion can be recovered by a diafiltration process. Stripping is repeated until all the desired metals have been selectively recovered. Again in some instances, the metal ions may be so tightly bound to the polymer that it is more desirable to heat process the concentrate to destroy the polymer to recover the metals. Optionally, for waste management purposes it may be desirable to solidify the polymer-bound metal, e.g., in a grout or cement material, such that it passes toxic leach tests (TCLP).

Still another composition uses a polymer formulation (two or more polymers of same molecular weight range) blended in such a ratio and with such functionality to have the desired selectivity that binds a combination of metal ions under certain conditions of pH, counter ion, and/or ionic strength. Separation is achieved by binding the metal ions to the water-soluble polymers and then using a separation technique such as ultrafiltration to remove the water and other materials from the polymer. The mixed polymer-bound metals are thus concentrated and can be further purified by washing with a clean solution in a diafiltration process to remove any final impurities. The polymer-bound metals can be selectively released from the polymers by a variety of processes as shown in equations 1, 2, and/or 3. When the process uses equation 1 and/or 2, the water-soluble polymers may be selectively stripped of the respective metal or group of metals by, e.g., appropriate pH control into a range whereat one polymer is stripped of its particular metal while the second water-soluble polymer retains its particular metal as a water-soluble polymer-bound metal. The second and subsequent polymers can be stripped of the remaining metal ions as desired for the separation process and the regeneration of the polymers for further reuse in the separation process.

Still another composition uses a polymer formulation (two or more polymers of different molecular weight range) blended in such a ratio and with such functionality to have the desired selectivity that binds a combination of metal ions under certain conditions of pH, counter ion, and/or ionic strength. Separation is achieved by binding the metal ions to the water-soluble polymer and then using a separation technique such as ultrafiltration to remove the water and other materials from the polymer. The mixed polymer-bound metals are thus concentrated and can be further purified by washing with a clean solution in a diafiltration process to remove any final impurities. The polymer-bound metals can be selectively released from the polymers by a variety of processes as shown in equations 1, 2, and/or 3. When the process uses equation 1 and/or 2, the water-soluble polymers may be selectively stripped of the respective metal ions or group of metal ions by, e.g., appropriate pH control into a range whereat one polymer is stripped of its particular metal while the second water-soluble polymer retains its particular metal as a water-soluble polymer-bound metal. The second and subsequent polymers can be stripped of the remaining metal ions as desired for the separation process and the regeneration of the polymers for further reuse in the separation process. Alternatively, since the water-soluble polymers are of different size ranges, it is possible to remove the metal from one polymer by the equations 1 to 3, and to separate the smaller polymer containing one type of functionality from the larger polymer with a different type of functionality. One of the functionalities is chosen to bind the metal ion of interest so tightly that the polymer that contains that functionality and the bound metal ions can be size separated from the other size polymer(s).

Another composition can include a single polymer or formulation of polymers that will bind with a single metal ion or a combination of metal ions under the conditions of the method. Separation and selectivity is realized by binding that combination of metal ions to the water-soluble polymer or polymers, then using a single pass separation technique such as ultrafiltration to remove the water and other materials from the polymer-bound metals. The polymer-bound metals are further concentrated to dryness or near dryness onto a flat ultrafiltration membrane. The membrane is either dissolved or digested in appropriate medium or leached with an appropriate acid or ligand to totally recover the metals that were on the membrane. The recovered solution which constitutes a concentrate of selected metal ions from the original solution can then be analyzed using appropriate analytical instrument or wet chemistry techniques.

Another composition can include a single polymer or formulation of polymers that will bind with a single metal ion or a combination of metal ions under the conditions of the process. Separation is achieved by binding the selected metal ions to the water-soluble polymer or polymers and then using a separation technique such as biphasic liquid-liquid extraction to remove other materials and unbound metal ions from the aqueous polymer solution. The metals that are unbound to the polymer and go into the organic or second phase are separated from the polymer-containing aqueous phase by standard phase separation techniques, e.g., mixer settlers, liquid extraction membranes, or centrifugal contactors, etc. The metals can be back-extracted from the second phase to another aqueous phase for recovery purposes. The polymer can be regenerated from the aqueous stream by first concentration ultrafiltration followed by diafiltration. This process can be reversed by back extracting the metal ion of interest from a biphasic system using aqueous solutions of the water-soluble polymer.

Generally, the concentration of the water-soluble polymer in metals separation is from about 0.001 weight to volume percent to about 25 weight to volume percent of final mixed solution, more preferably from about 0.001 weight to volume percent to about 5 weight to volume percent of final solution. It is sufficient and in some cases desirable to have at least just enough polymer in solution such that the molar ratio of polymer to metal ions in solution is one. Using high concentrations of the water-soluble polymer can most often result in a lower flux or flow during an ultrafiltration stage. The use of high polymer concentration can also cause an aggregation effect where no or little metal ion binding occurs to the polymer when the metal ion sees a high initial concentration of polymer. During the diafiltration stage the polymer and metal bound polymer concentration can often become quite high and in the case where the solution goes to near dryness it can approach 90% of the weight of the concentrate.

After the solution containing the water-soluble polymer is contacted with the aqueous solution for a sufficient period of time to form water-soluble polymer-metal complex, separation of the water-soluble polymer-metal complex is preferably accomplished by ultrafiltration. Ultrafiltration is a pressure driven separation occurring on a molecular scale. As a pressure gradient is applied to a process stream contacting the ultrafiltration membrane, liquid including small dissolved materials are forced through pores in the membrane while larger dissolved materials and the like are retained in the process stream. Pressure gradients can be created, as desired, from the use of vacuum systems, centrifugal force, mechanical pumping, and pressurized air and/or gas systems (e.g., nitrogen).

In the use of the present water-soluble polymers, an ultrafiltration unit can generally consist of hollow-fiber cartridges or membrane material having a 1,000 MWCO to 1,000,000 MWCO preferably 10,000 MWCO to 100,000 MWCO. Other membrane configurations such as spiral-wound modules, stirred cells (separated by a membrane), thin-channel devices, centrifuge units (separated by a membrane) and the like may also be used although hollow-fiber cartridges are generally preferred for the continuous/semicontinuous process filtration units. For analytical applications for preconcentration purposes stirred cells and centrifuge ultrafiltration units are preferred. Small hollow-fiber cartridges also can be used for continuous preconcentration for analytical applications. Among the useful ultrafiltration membranes are included cellulose acetate, polysulfone, and polyamide membranes such as polybenzamide, polybenzamidazole, and polyurethane.

The use of ultrafiltration for separation is further described in Kirk Othmer: Encyclopedia of Polymer Science and Engineering, 2nd Ed., vol. 17, pp. 75–104, 1989, such description incorporated herein by reference.

Generally, the water-soluble polymers have molecular weights of from greater than 1,000 to about 1,000,000, and preferably from greater than 10,000 to 100,000. Above molecular weights of 1,000,000 some polymers tend to lose solubility, while polymers below molecular weight of about 1000, retention by suitable ultrafiltration membranes can present problems such as low flux rates.

The water-soluble polymers of the present invention can be provided with distinct preselected molecular weight ranges through purification or sizing. For example, by filtering polyethyleneimine through the particular size ultrafiltration membrane (e.g., UFP-10-C-5 available from AG Technologies, Corp. with available MWCO's of 10,000, 30,000 and 100,000), polyethyleneimine can be provided with: (1) a molecular weight range of greater than about 10,000 and essentially free of molecular weights of less than about 10,000; (2) a molecular weight range of greater than about 30,000 and essentially free of molecular weights of less than about 30,000; (3) a molecular weight range of greater than about 100,000 and essentially free of molecular weights of less than about 100,000; (4) a molecular weight range of from about 10,000 to about 30,000 and essentially free of molecular weights of less than about 10,000 and greater than about 30,000; (5) a molecular weight range of from about 10,000 to about 100,000 and essentially free of molecular weights of less than about 10,000 and greater than about 100,000; and, (6) a molecular weight range of from about 30,000 to about 100,000 and essentially free of molecular weights of less than about 30,000 and greater than about 100,000. Other water-soluble polymers can be sized in a similar fashion. Other preselected ranges should become available as other membranes with other MWCO's become available.

The water-soluble polymers can be used in the recovery of metal ions from aqueous streams as described by Smith et al., in U.S. patent application Ser. No. 08/453,406, filed concurrently herewith, entitled "Water-Soluble Polymers for Recovery of Metal Ions from Aqueous Streams", can be used in the recovery of metals from solids as described by Smith et al., in U.S. patent application Ser. No. 08,453,596, filed concurrently herewith, entitled "Water-Soluble Polymers for Recovery of Metals from Solids", and can be used for the displacement of cyanide ions from metal-cyanide complexes as described by Smith et al., in U.S. patent application Ser. No. 08/453,597, filed concurrently herewith, and now U.S. Pat. No. 5,643,456, entitled "Process for the Displacement of Cyanide Ions from Metal-Cyanide Complexes", such descriptions incorporated herein by reference.

The present invention is described in more detail in the following examples which are intended as illustrative only, since numerous modification and variations will be apparent to those skilled in the art. Examples 1–31 show the preparation of PEI, PEI derivatives, and other water-soluble polymers. Example 32 shows the use of such polymers in separation of metal ions from aqueous streams.

EXAMPLE 1

(polymer A)

The polyethyleneimine (PEI) was prepared as follows. Crude polyethyleneimine (obtained from BASF as Polymin Waterfree PEI and as PEI homopolymer P) was obtained in two molecular weight ranges. The Polymin Waterfree polymer was reported to have a molecular weight in the range of 10,000 to 25,000, while the PEI homopolymer P was reported to have a molecular weight range of 70,000 to 750,000, depending upon the method of molecular weight measurement. In reality both of these polymers had a broad molecular weight range and had material that passed through ultrafiltration membranes that have 10,000 MWCO and 30,000 MWCO and 100,000 MWCO. These polymers from BASF were highly branched having a primary to secondary to tertiary nitrogen ratio of approximately 1:2:1.

To demonstrate the effect of pH on polymer size a 1 wt/vol % solution of Polymin Waterfree was adjusted with acid or base to span the pH region between 2 and 10. The solutions were diafiltered through a 30,000 MWCO membrane with permeate samples taken periodically to determine polymer concentration using the copper method described below. The concentration of polymer permeating the membrane at a high pH was considerably greater (0.014% at 15 min) than that passing through at lower pH values (0.003% at 15 min). The largest difference occurred between pH 10 and 8, with the sequential lowering of the pH leading to smaller effects on the polymer size, with very little difference in size at a pH of 4 and 2. Due to this dramatic change in polymer size, polyethyleneimine was purified by diafiltration at a relatively high pH value (pH 10.8 for PEI).

The polymer was purified using hollow-fiber membranes prepared by a special extrusion process, ultrafiltration membrane cartridges prepared from polysulfone material in a special homogeneous fiber construction, where the microporous structure does not have macrovoids. Membranes such as UFP-10-C-5 (currently manufactured by AG Technologies, Corp.) were the only type of material found to purify polyethyleneimine and allow for membrane washing to recover full flux rates after substantial use.

The polyethyleneimine was diluted in water to approximately 10–15% by weight. The pH was about 10.5 upon dissolution of the polyethyleneimine. The solution was diafiltered using 10,000 MWCO, 30,000 MWCO, and 100,000 MWCO membranes (keeping the volume constant) until 6–7 volume equivalents of water were passed through the system at less than or equal to 25 PSI. Following the diafiltration step, the solution volume was reduced approximately 85% to concentrate the polymer. The remaining water was removed under vacuum and mild heat to yield colorless, viscous purified polyethyleneimine. Thus, with Polymin Waterfree 25% by weight PEI came through the 10,000 MWCO membrane, 10% by weight PEI came through the 30,000 MWCO and not the 10,000 MWCO membrane, and 65% by weight was retained by the 30,000 MWCO membrane (this fraction referred to hereinafter as polymer Aa). With the Polymin P polymer 16% by weight passed through the 10,000 MWCO membrane. 3% by weight was less than 30,000 MWCO and greater than 10,000 MWCO, 5% by weight was less than 100,000 MWCO and greater than 30,000 MWCO, and 76% by weight was greater than 100,000 MWCO (this fraction referred to hereinafter as polymer Ab). The material resulting from the retentate from the 30,000 MWCO (polymer Aa), when filtered on a 10,000 MWCO membrane, gave no detectable passage of the polymer through a 10,000 MWCO membrane using a copper test developed to detect less than 1 ppm of polyethyleneimine polymer. Similarly for material collected at greater than 100,000 MWCO (polymer Ab) when tested on a 30,000 MWCO membrane no detectable polymer was observed in the permeate. For some applications the polymer concentrate did not require drying but could be concentrated to a workable volume as subsequent functionalization reactions were performed in water.

The copper test involved placing 0.5 mL of the test sample into a 10 mL volumetric flask, adding 0.5 mL of a copper acetate solution (1.99 g of copper acetate diluted to 100 mL with 0.01M HCl), 1.0 mL of pH 5.8 buffer (0.6 mL of acetic acid diluted to 100 mL with deionized water with addition of 11.2 g of anhydrous sodium acetate and sufficient sodium acetate or acetic acid to adjust pH to 5.8), and deionized water to dilute to mark. This solution was mixed well. A standard curve for an UV-VIS spectrophotometer was prepared using 0.01%, 0.02%, 0.05%, and 0.08 wt/vol % solutions of PEI. A reagent blank was used as a reference sample and read at 284 nanometers.

The specifications for the membrane included hollow-fibers of a material to which polyethyleneimine does not adhere to any significant extent, i.e., detrimental effect on flux. The routine operational pH range of the cartridges fell between 2 and 12 with the ability to process solutions down to a pH of 0 to 1 for limited periods of time (30 min) without damage to the cartridges. Minimum flux rates were 0.01 gallons/min/sq.ft. at 25° C. and at a transmembrane pressure of 15 PSI with a solution of 5% by weight branched polyethyleneimine (Polymin Waterfree 10,000–25,000 MW). Original flux rates of the cartridge were readily regenerated after use by a simple cleaning process of a 10 minute flush with water followed by 30 min with 500 ppm hypochlorite and rinsing with water. The cartridge had at least a minimum operational pressure of 50 PSI at 25° C. The cartridges had the ability to be operated at temperatures up to 80° C.

EXAMPLE 2

(polymer B)

An amino-carboxylic acid containing water-soluble polymer of the structure:

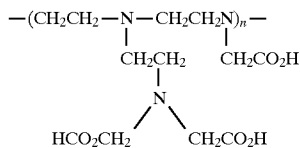

was prepared on polyethyleneimine (PEI, Polymin Waterfree used as received from BASF, i.e., unpurified)) using a molar ratio of carboxylic acid moiety to sub-units of $CH_2CH_2N$ within the PEI of about 4 to 1 as follows: A solution of potassium hydroxide (260.4 g) in water (400 mL) was added dropwise over a period of 30 minutes to a solution of polyethyleneimine (25.02 g) and bromoacetic acid (322.4 g) in water (500 mL) keeping the temperature below 50° C. After the addition was complete, the solution was stirred at reflux for 3 hours. The solution was cooled to room temperature then diluted to 2 liters with deionized water. The pH of the solution was adjusted to 5.8 using potassium hydroxide or hydrochloric acid. The polymer was purified by diafiltration collecting five volume equivalents of permeate using hollow fiber cartridges with a 30,000 MWCO. The retentate solution was then concentrated and the remaining water was removed under reduced pressure. The residual material (referred to hereinafter as polymer B) was dried in a vacuum oven at 60° C. overnight to give 50.78 g of a light tan brittle solid. IR (ATR): 1630 cm$^{-1}$ (C=O). Elemental Analysis Found: C, 32.58%; H, 4.97%; N, 8.54%; O, 28.99%.

EXAMPLE 3

(polymer C)

A partially functionalized carboxylic acid containing water-soluble polymer of the following structure:

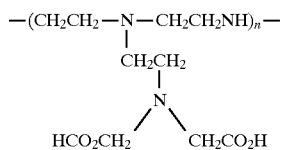

was prepared on polyethyleneimine (BASF, Polymin Waterfree, purified as in Example A, >30,000 MWCO) using a molar ratio of carboxylic acid moiety to sub-units of $CH_2CH_2N$ within the PEI of about 0.5 to 1. The source of carboxylic acid was chloroacetic acid in one case and bromoacetic acid in another case. The procedure, as in Example B, was followed except for the differences noted here. Elemental Analysis Found: C, 44.72%; H, 8.35%; O, 29.3%. The polymer is referred to hereinafter as polymer C.

A partially functionalized carboxylic acid containing water-soluble polymer was prepared on polyethyleneimine (BASF, Polymin P, unpurified, 70,000 to 700,000 MW range) using a molar ratio of carboxylic acid moiety to subunits of $CH_2CH_2N$ within the PEI of about 0.5 to 1. The source of carboxylic acid was chloroacetic acid. The procedure as in example B was followed except for differences noted here. The material was diafiltered through several molecular weight cutoff membranes such that a molecular weight fraction of greater than 10,000 MWCO but less than 30,000 MWCO and a molecular weight fraction greater than 30,000 MWCO but less than 100,000 MWCO (referred to hereinafter as polymer Ca) and a fraction greater than 100,000 MWCO (referred to hereinafter as polymer Cb) were obtained.

EXAMPLE 4

(polymer D)

A fully functionalized phosphonic acid containing water-soluble polymer of the structure:

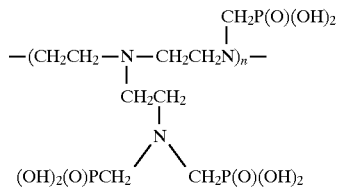

was prepared on a polyethyleneimine (Polymin Waterfree from BASF used as received, i.e., unpurified). Polyethyleneimine (2.50 g, about 0.058 mole monomer equivalent) was dissolved in 6M hydrochloric acid (80 mL) followed by the addition of solid phosphorous acid (19.0 g, 0.29 mole) at room temperature. The homogeneous solution was brought to reflux followed by the dropwise addition of formaldehyde (38 mL of a 37% solution, 0.47 mole) over a hour. After the addition was complete, the solution was stirred at reflux for an additional hour. The heat was removed and the flask allowed to sit overnight at room temperature. The sticky solid precipitate was collected by decantation of the liquid from the flask. The solid was dissolved in water and adjusted to pH 6.8 with sodium hydroxide. The solution was purified by diafiltration through a 30,000 MWCO membrane. A total permeate volume of 3.5 liters was collected. The solution was then concentrated to approximately 150 mL. After removing the water under reduced pressure, the residue (referred to hereinafter as polymer D) was dried under high vacuum at 60° C. overnight to give 6.3 g of a light yellow solid. Elemental analysis found: C, 22.46%; H, 5.48%; N, 8.70%; P, 16.88%.

EXAMPLE 5

(polymer E)

A partially functionalized phosphonic acid containing water-soluble polymer of the structure:

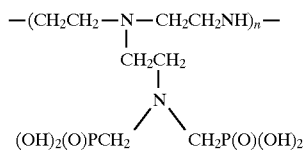

was prepared on a polyethyleneimine. Polyethyleneimine (BASF Polymin -Waterfree, 10,000–25,000 MW and pre-purified by diafiltration through a 30,000 MWCO cartridge prior to use as in example A, 25.0 g, 0.58 mole monomer equivalent) was dissolved in 6M hydrochloric acid (300 mL) followed by the addition of solid phosphorous acid (47.56 g, 0.58 mole) at room temperature. The homogeneous solution was brought to reflux followed by the dropwise addition of formaldehyde (23.53 mL of a 37% solution, 0.29 mole) over a hour. After the addition was complete the solution was stirred at reflux for an additional hour. The heat was removed and the flask allowed to sit overnight at room temperature. The reaction mixture was diluted with water to 2 liters and the pH adjusted to 6.8 using potassium hydroxide. The solution was purified by diafiltration through a 30,000 MWCO. A total permeate volume of 6 liter was collected. The solution was then concentrated to approximately 200 mL. After removing the water under reduced pressure, the residue (referred to hereinafter as polymer E) was dried under high vacuum at 60° C. overnight to give 32 g of a light yellow solid. Elemental analysis: %C, 30.18; %H, 8.42; %N, 13.95; %P, 14.05; %K, 0.15.

A partially functionalized phosphonic acid containing water-soluble polymer was prepared on polyethyleneimine (BASF, Polymin P, unpurified, 70,000 to 700,000 MW range) using a molar ratio of phosphonic acid moiety to subunits of $CH_2CH_2N$ within the PEI of about 0.5 to 1. The procedure as in example E above was followed except for differences noted here. The material was diafiltered through several molecular weight cutoff membranes such that a molecular weight fraction of greater than 10,000 MWCO but less than 30,000 MWCO and a molecular weight fraction greater than 30,000 MWCO but less than 100,000 MWCO (referred to hereinafter as polymer Ea) and a fraction greater than 100,000 MWCO (referred to hereinafter as polymer Eb) were obtained.

EXAMPLE 6

(polymer F)

An acylmethylpyrazone containing water-soluble polymer of the structure:

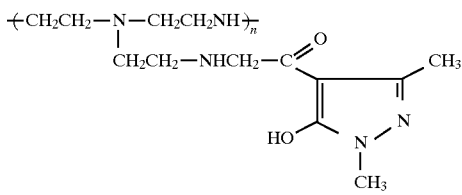

was prepared on a polyethyleneimine as follows: A precursor (4-chloroacetyl-1,3-dimethyl-pyrazol-5-one) was first prepared as first. To a 500 mL three-neck round bottom flask fitted with a reflux condenser, mechanic stirrer, and a pressure equalizing additional funnel, 1,3-dimethylpyrazol-5-one (6.03 g, 53.84 mmole) and dioxane (55 mL, distilled from sodium metal) were added. The mixture was heated to 40°–50° C. to dissolve the suspended solids and give a light yellow solution. The reaction mixture was cooled to 30°–35° C. followed by the addition of $Ca(OH)_2$ (7.98 g, 107.68 mmole). After 10 minutes of stirring, chloroacetyl chloride (6.82 g, 59.22 mmole) in dioxane (20 mL) was added over a period of 30 minutes. The reaction mixture was heated at reflux for 24 hours. The reaction mixture was filtered while hot and the filter cake washed with hot dioxane (2×20 mL) followed by methanol (2×20 mL). The solvent was removed under reduced pressure yielding 14 g of the product as the calcium salt. The solid was passed through a column of Dowex-50W strongly acid cation exchange resin. Water was removed under reduced pressure leaving a white solid which was further dried under vacuum at 60° C. over night to give the product (61%, m.p.—161°–165° C.) as a white solid in 61% yield. $^1$H NMR ($CDCl_3$, ppm) δ4.38(s), 3.60(s), 2.41 (s). $^{13}$C NMR ($CDCl_3$, ppm) 15.6, 32.7, 45.7, 101.0, 146.0, 159.3, 188.2.

The polymer was then prepared as follows: PEI polymer (4.00 g, prefiltered through a 30,000 MWCO cartridge as in example A, was dissolved in water (100 mL) and brought to reflux. The 4-chloroacetyl-1,3-dimethyl-pyrazole-5-one precursor from above (4.40 g, 23.33 mmol) and triethylamine (4.68 g, 46.25 mmol) dissolved in water (20 mL) were added dropwise over a 10 minute period. The solution was stirred at reflux for 2.5 hours at which time it turned from yellow to orange and then to red. After cooling to room temperature, the material was diluted with deionized water to a volume of 1 liter and the polymer purified by diafiltration through a 30,000 MWCO cartridge collecting 5 liters of permeate. The water was removed under reduced pressure and the residue (referred to hereinafter as polymer F) was dried under vacuum at 60° C. to give a reddish-orange, brittle solid (5.49 g, 73%). IR (ATR): 3435 (N—H), 1626 (C=O) cm$^{-1}$. Elemental Analysis: C, 53.85%; H, 8.65%; N, 24.59%; O, 12.98%.

EXAMPLE 7

(polymer G)

An acylphenylpyrazolone containing water-soluble polymer of the structure:

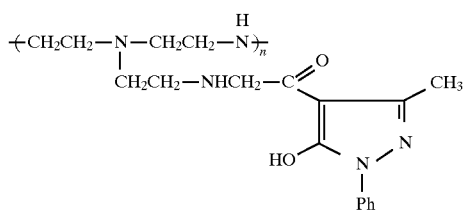

was prepared on a polyethyleneimine as follows. PEI (1.00 g, Polymin Waterfree, unpurified) and triethylamine (2.34 g, 23.1 mmol) were dissolved in chloroform (30 mL) and brought to reflux. The 1-phenyl-3-methyl-4-chloroacetyl-pyrazole-5-one, prepared following the procedures of Jensen in ACTA Chem. Scand., 1959, 13, 1668 and Okafor et al. in Synth. React. Inorg. Met. Org. Chem., 1991, 21(5), 826, (3.18 g, 5.8 mmol), in chloroform (10 mL) was added dropwise to the solution resulting in the precipitation of a tan solid. After stirring for 1.5 hours, the mixture was cooled and the suspended solid collected by filtration. The solid was dissolved in water (400 mL) adjusted to a pH of 3.0, and the solution diafiltered using a 30,000 MWCO cartridge. The water was removed under reduced pressure and the residue (referred to hereinafter as polymer G) dried in a vacuum oven at 60° C. to give 1.56 g as a red brittle solid. IR (ATR): 3430 (N—H), 1630 (C=O) $cm^{-1}$.

EXAMPLE 8

(polymer H)

A hydroxamic acid containing water-soluble polymer of the structure:

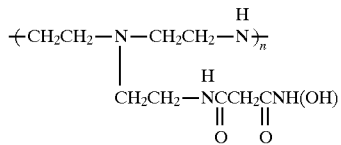

was prepared on polyethyleneimine (PEI). Hydroxylamine hydrochloride (2.78 g, 39.97 mmol) was dissolved in methanol (15 mL). Potassium hydroxide (2.24 g, 39.97 mmol), dissolved in methanol (10 mL), was added dropwise to the hydroxylamine solution. The mixture was stirred for 1 hour after which the precipitated potassium chloride was collected by filtration. To the filtrate was added solid succinic anhydride (4.00 g, 39.90 mmol). The mixture was stirred at room temperature for 3 hours. The solvent was removed under reduced pressure leaving a white sticky solid. The solid was allowed to sit under anhydrous diethyl ether for one hour. The solid was collected by filtration giving 4.80 g of the monohydroxamic acid of succinic acid as a white solid with a melting point of from 72°–82°.

This solid (1.00 g, 7.51 mmol), dicyclohexylcarbodiimide (DCC) (1.54 g, 7.51 mmol) and a catalytic amount of 4-(dimethylamino)pyridine were dissolved in tetrahydrofuran (THF) (10 mL). After stirring for 24 hours at room temperature, the solution was filtered to remove the DCU (dicyclohexylurea) byproduct. This THF solution was added to a methanolic solution containing polyethyleneimine (1.29 g, 29.95 mmol monomer eq., prepurified as in Example A, >30,000 MWCO), a small amount of phenolphthalein, and enough sodium methoxide to make the solution pink. The solution was stirred for 5 hours. The solvent was evaporated and the product purified by dissolving in water and diafiltration through a 30,000 MWCO hollow-fiber membrane. Evaporation of the water followed by drying under vacuum at 60° C. gave 1.21 g of a white polymer (referred to hereinafter as polymer H). Testing with the iron chloride test gave a dark red color indicating a positive test for the presence of hydroxamic acid.

EXAMPLE 9

(polymer I)

A hydroxamic acid containing water-soluble polymer of the structure:

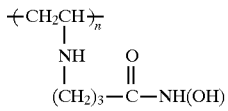

was prepared from the ring opening of polyvinylpyrrolidone with hydroxamic acid to give polyvinylamine-N(pentanoic hydroxamic acid) (PVA-PHA). Polyvinylpyrrolidone (1.0 g, MW 40,000, Aldrich), sodium hydroxide (40 mL of 1.0M), and hydroxylamine hydrochloride (2.71 g) were mixed together and heated to 90° C. A pH 12 was maintained by small additions of sodium hydroxide if necessary. The solution was heated for two days, cooled and dialyzed through a 20,000 MWCO membrane. Water was removed from the polymer solution under vacuum to give a clear solid material upon drying in an oven at 60° C. (referred to hereinafter as polymer I) which gave a positive ferric chloride test for hydroxamic acid (hydroxylamine does not give a positive ferric chloride test).

EXAMPLE 10

(polymer J)

A ester functionalized water-soluble polymer of the structure:

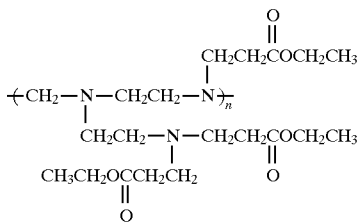

was prepared as follows: Polyethyleneimine (1.00 g, purified as in Example A, >30,000 MWCO) was dissolved in ethyl acrylate (9.21 g, 92 mmol)) and the solution stirred at reflux for 3 hours. The excess ethyl acrylate was removed under vacuum keeping the temperature below 70° C. to avoid its' polymerization. The viscous polymeric material was used in the next step without further purification (referred to hereinafter as polymer J).

EXAMPLE 11

(polymer K)

A hydroxamic acid functionalized water-soluble polymer of the structure:

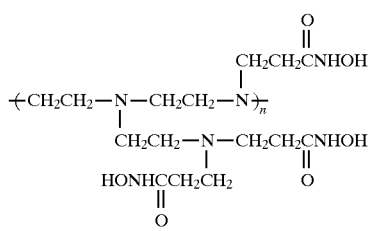

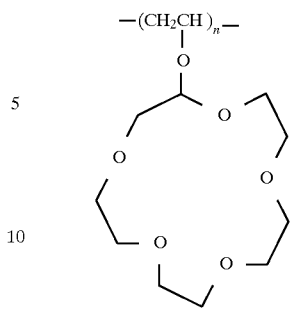

was prepared as follows. The polymer from Example I was treated with potassium hydroxide (15.46 g, 0.28 moles) followed by a solution of hydroxylamine hydrochloride (12.79 g, 0.18 moles) in methanol (100 mL) maintaining a temperature below 20° C. The mixture was stirred for 1 hour then filtered. The filtrate was added to the crude PEI/ethyl acrylate adduct and stirred at room temperature for 14 hours. The methanol was removed under reduced pressure and the residue dissolved in water (50 mL). The polymer was purified by diafiltration using a stirred cell with a 30,000 MWCO polysulfone membrane. After the collection of 6 volume equivalents (300 mL) of permeate, the water was removed from the retentate under reduced pressure and the material dried in a vacuum oven at 60° C. overnight to give 92.22 g of the polymer (referred to hereinafter as polymer K) as a light tan brittle solid which was very hygroscopic. IR (ATR): 1732 (C=O) cm$^{-1}$.

EXAMPLE 12

(polymer L)

An aza crown ether containing water-soluble polymer of the structure:

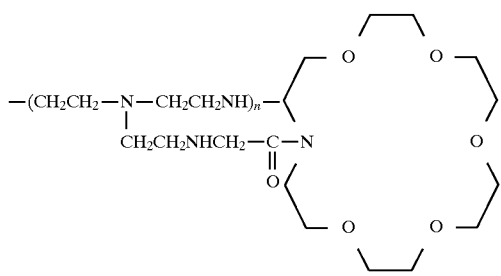

was prepared on a polyethyleneimine as follows: N-Chloroacetyl-aza-18-crown-6 (0.56 g, 1.65 mmol), polyethyleneimine (0.29 g, prepurified as in example A, >30,000 MWCO) and potassium carbonate were combined in acetonitrile and stirred at reflux for 16 hours. After cooling to room temperature, the solvent was removed under reduced pressure leaving a brown oil. The residue was dissolved in water and the polymer purified by diafiltration. Evaporation of the water followed by drying under vacuum at 60° C. gave 0.81 g of a tan solid (referred to hereinafter as polymer L) characterized by IR, $^1$H and $^{13}$C NMR.

EXAMPLE 13

(polymer M)

An all oxygen contain crown ether water-soluble polymer of the structure:

composed of 15-crown-5 ether on polyvinylalcohol was prepared. 247 mg (4.94 mmole) of the polyvinylalcohol (88% hydrolyzed) in 10 mL of dried DMF was warmed to 50°–60°C. to dissolve. The clear solution was than cooled down to room temperature and 341 mg (2.47 mmole) of K$_2$CO$_3$ was added. The mixture was stirred for 30 min. Then, 0.67 g (0.33 mmole) of the 15-crown-5 in 2 mL of dried dimethylformamide was added to the reaction mixture. The colorless mixture turned to green-blue in 45 minutes and became light yellow in 2 hours. The yellow mixture was allowed to stir at 50°–60° C. for overnight. The reaction was quenched in water, the suspension was filtered and the polyvinylalcohol-crown ether was purified by ultrafiltration with a 30,000 MWCO cartridge and yielded 150 mg of polymer (referred to hereinafter as polymer M) and characterized by IR, $^1$H and $^{13}$C NMR.

EXAMPLE 14

(polymer N)

A permethylated poly(vinylamine) water-soluble polymer of the structure:

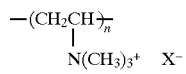

was prepared as follows: Poly(vinylamine) (10.0 g) was dissolved in 50 mL of methanol and transferred to a four-neck round bottomed flask containing an additional 50 mL of methanol. Phenolphthalein (10.0 mg) was added resulting in a light pink solution. Sodium methoxide (38.85 g, 0.72 mole) suspended in 450 mL of methanol and dimethylsulfate (90.69 g, 0.72 mole) dissolved in 100 mL of methanol were added simultaneously by separate pressure equalizing addition funnels at such a rate as to maintain a light pink color. The addition process was conducted under a nitrogen atmosphere at room temperature. It was necessary to add additional sodium methoxide (3.0 g in 50 mL of methanol) to maintain the pink color throughout the dimethylsulfate addition. The total addition time was about 1.5 hours.

After the completed addition, the solution was brought to reflux and stirred for about 1.5 hours. After cooling to room temperature, the solution was transferred to a single neck flask and the solvent removed under reduced pressure leaving a dark yellow material. The material was re-dissolved in 450 mL of deionized water and the solution diafiltered using a 30,000 MWCO hollow-fiber cartridge. Five volume equivalents or about 2.5 L of permeate was collected. For anion exchange, 50 g of sodium chloride in 150 mL of water was added and the solution allowed to stand overnight The solution was then diafiltered with 3 L of deionized water. The water from the retentate was removed under reduced pressure and the residue (referred to hereinafter as polymer N) dried under vacuum at 60° C. overnight to yield 19.58 g (69%) of an orange-brown crystalline solid. IR (KBr): 3437 (N—H), 2928, 1629 (C=O), 1481 cm⁻¹. Elemental Analysis: C, 48.25%; H, 10.68%; N, 10.92%; Cl, 15.87%; S, <0.97%.

EXAMPLE 15

(polymer O)

A permethylated polyallylamine of the structure:

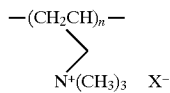

was prepared. Polyallylamine (10.0 g, Aldrich) was dissolved in 100 mL of methanol and transferred to a four-neck round bottomed flask containing an additional 50 mL of methanol. Phenolphthalein (14.0 mg) was added to the solution. Sodium methoxide (23.70 g, 0.44 mole) suspended in 400 mL of methanol and dimethylsulfate (42.0 g, 0.33 mole) dissolved in 70 mL of methanol were added simultaneously by separate pressure equalizing addition funnels at such a rate as to maintain a light pink color. The addition process was conducted under a nitrogen atmosphere at room temperature. It was necessary to add additional sodium methoxide (3.0 g in 50 mL of methanol) to maintain the pink color throughout the dimethylsulfate addition. The total addition time was about 30 minutes.

After the completed addition, the solution was brought to reflux and stirred for about 1.5 hours. After cooling to room temperature, the solution was transferred to a single neck flask and the solvent removed under reduced pressure leaving an opaque pink material. The material was re-dissolved in 500 mL of deionized water and the solution diafiltered using a 30,000 MWCO hollow-fiber cartridge. Five volume equivalents or about 2.5 L of permeate was collected. For anion exchange, 50 g of sodium chloride in 150 mL of water was added and the solution allowed to stand overnight The solution was then diafiltered with 2.6 L of deionized water. The water from the retentate was removed under reduced pressure and the residue dried under vacuum at 60° C. overnight to yield 10.18 g (70%) of a light yellow crystalline solid (referred to hereinafter as polymer O). IR (KBr): 3437, 2929, 1686, 1485, 1251 cm⁻¹. Elemental Analysis: C, 47.85%; H, 10.62%; N, 10.62%; Cl, 11.78%; S, 1.13%.

EXAMPLE 16

(polymer P)

A guanidinium-containing PEI polymer of the following structure:

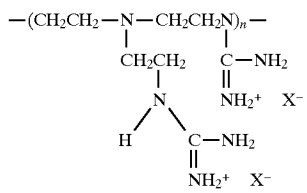

was prepared as follows: Polyethyleneimine (as prepurified in example A, >30,000 MWCO, 5.0 g, 116 mmole amine) and O-methylisourea-hemisulfate (Jansen, 14.35 g, 116 mmol) were placed in a 125 mL flask and dissolved in 12 mL water with shaking. The solution was allowed to stand for 2 days, and was then placed in dialysis tubing (Spectra Por, 15,000 MWCO). The tubing with the reaction mixture was placed in a 1 L jar containing deionized water, and the water was changed 5 times. The contents of the dialysis tubing was concentrated to a white foam by rotary evaporation, and then dried to a colorless glassy foam (referred to hereinafter as polymer P) under vacuum at 60° C. overnight. Yield: 5.04 g. Elemental Analysis: C 33.88%, H 7.70%, N 26.69%, S 9.63%;

EXAMPLE 17

(polymer Q)

A permethylated PEI polymer of the structure:

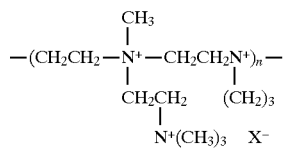

was prepared. Purified PEI (20.0 g as prepared as in example A, >30,000 MWCO) was dissolved in 200 mL of methanol and placed in a round bottom flask outfitted with a condenser under argon. Dimethyl sulfate (120 g, 0.95 moles, Eastman) dissolved in 110 mL methanol was added slowly from an addition funnel. After addition (about 3 hours) the reaction was brought to reflux while potassium carbonate (64.2 g, 0.046 moles, Janssen) was added slowly from a solids addition funnel (care should be taken to do a slow addition to prevent excess foaming). The solution was cooled, filtered, and the methanol removed under vacuum. The solid filter cake was dissolved in 600 mL of water and combined with the residue from the filtrate. The combined solution was purified by dialfiltration (30,000 MWCO) using water. The anion was exchanged for chloride by adding 120 gm sodium chloride in 400 mL water and then stirring for 48 hours. The solution was concentrated and further diafiltered (30,000 MWCO) with water to 5 L volume changes. The final solution was concentrated by ultrafiltration to 500 mL and then further concentrated and dried under vacuum to give a 21.6 g of an off-white glassy polymer (referred to hereinafter as polymer Q). Elemental Analysis: C 34.15%, H 8.07%, N 8.96%, S 15.56%. Potentiometric titration of the polymer gave a sharp strong-acid-base type titration curve indicating that all the amine sites were methylated. (If the curve was not sharp, it would indicate that methylation was incomplete).

EXAMPLE 18

(polymer R)

An amide containing water-soluble polymer of the structure:

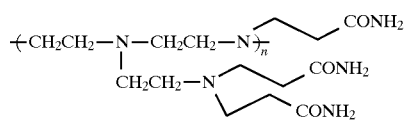

was prepared as follows: Polyethyleneimine (2.00 g, prepared as in Example A, >30,000 MWCO) was dissolved in methanol (20 ml) and brought to reflux. Acrylamide (4.95 g, 70 mmol) and butylated hydroxytoluene (BHT, 200 ppm in solution) was dissolved in methanol (20 ml) and added dropwise to the reaction flask over a 15 minute period. The solution was stirred at reflux for 24 hours. After cooling to room temperature, deionized water (400 ml) was added and the polymer purified by diafiltration using a 30,000 MWCO cartridge. The water was removed under reduced pressure and the polymer dried in a vacuum oven at 60° C. to yield 4.5 g of a clear glassy solid (referred to hereinafter as polymer R) and characterized by IR, $^1$H and $^{13}$C NMR.

EXAMPLE 19

(polymer S)

A permethylated polyvinylpyridine of the structure:

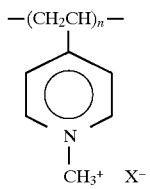

was prepared as follows: To a solution of polyvinylpyridine (3 g as a 25% solution in methanol, Reilly Industries) was added dropwise iodomethane (4.85 g, 0.03 mole) in 2 mL of methanol at room temperature. After addition was complete, the solution was stirred for about 2 hours giving a light green color. An additional amount of iodomethane (2 g) was added and allowed to stir for about 2 hours. Deionized water (200 mL) was added to the reaction mixture and the solution diafiltered with 1 L of permeate collected through a 30,000 MWCO membrane. The water from the retentate was removed under reduced pressure and the residue dried under vacuum at 60° C. overnight to yield 4.82 g (68%) of a yellowish green crystalline solid (referred to hereinafter as polymer S). IR (KBr): 3437 (N—H), 3028,2930,1640 (C═O), 1156 cm$^{-1}$. Elemental Analysis: C 40.74%, H 4.43%, N 6.22%, I 36.93%.

The iodide salt of polymer S was converted to the chloride salt by stirring the polymer overnight with sodium chloride (referred to hereinafter as polymer Sa). Elemental Analysis: C 52.65%, H 7.07%, N 8.27%, Cl 12.74%.

EXAMPLE 20

(polymer T)

A partially functionalized carboxylic acid containing water-soluble polymer of the following structure:

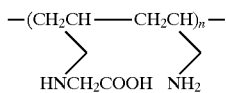

was prepared on polyallylamine. A solution of sodium hydroxide (2.139 g) in water (50 mL) was added dropwise over a period of 43 minutes to a solution of polyallylamine (5.0 g, Aldrich) and chloroacetic acid (2.53 g) in water (60 mL) keeping the temperature below 50° C. After the addition was complete, the solution was stirred at reflux for 3 hours. The solution was cooled to room temperature. The polymer was purified by diafiltration collecting five volume equivalents of permeate using hollow-fiber cartridges with a 30,000 MWCO. The bulk of the water was removed from the retentate under reduced pressure. The residual material was dried in a vacuum oven at 60° C. overnight to give 4.2 g of a light tan solid (referred to hereinafter as polymer T). UV/VIS: lambda max=296 nm. IR(ATR): 1638cm$^{-1}$ (C═O).

EXAMPLE 21

(polymer U)

A partially functionalized carboxylic acid containing water-soluble polymer of the following structure:

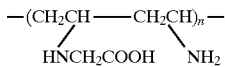

was prepared on polyvinylamine. A solution of sodium hydroxide (9.29 g) in water (160 mL) was added dropwise over a period of 35 minutes to a solution of polyvinylamine (10.0 g) and chloroacetic acid (10.97 g) in water (240 mL) keeping the temperature below 50° C. After the addition was complete the solution was stirred at reflux for 3 hours. The solution was cooled to room temperature. The pH of the solution was 11.8 and adjusted using sodium hydroxide or hydrochloric acid. The solution started to precipitate between pH 7 and 8.5. The polymer was purified by diafiltration and rinsed with deionized water and adjusted to pH 11.3. Five volume equivalents of permeate was collected using hollow-fiber cartridges with a 30,000 MWCO. The bulk of the water was removed under reduced pressure. The residual material was dried in a vacuum oven at 60° C. overnight to give 12.42 g of a light tan brittle solid (referred to hereinafter as polymer U). UV/VIS: lambda max=294 nm. IR (ATR): 1603 cm$^{-1}$ (C═O).

EXAMPLE 22

(polymer V)

A water-soluble copolymer containing betadiphosphonic ester and amide groups of the following structure:

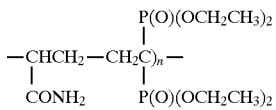

was prepared by copolymerization. Acrylamide (664 mg, 9.35 mmole), tetraethylethenyldienebis(phosphonate) (500 mg, 1.67 mmole), and ammonium persulfate (21 mg, 1%) as a polymerization initiator were dissolved in 20 mL of deionized water. The mixture was stirred vigorously at 65°–70° C. for 48 hours and the solution remained clear throughout. The reaction was cooled to room temperature and diluted with deionized water to 250 mL. The polymer was purified by diafiltration using a 30,000 MWCO cartridge and collected 5 volume equivalents of permeate. The retentate was concentrated and dried in a vacuum oven at 60° C. A colorless polymer was obtained (250 mg) (referred to hereinafter as polymer V). Characterized by IR, NMR, $^{31}$P NMR (PPM) 26.02, 27.42.

EXAMPLE 23

(polymer W)

A water-soluble copolymer containing betadiphosphonic acid ester and amide groups of the following structure:

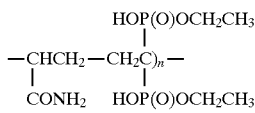

was prepared by copolymerization. Polymer V prepared as above (87 mg) was dissolved in 10 mL of deionized water. Excess NaOH (24 mg) was added. The clear solution was stirred at room temperature overnight. The reaction was quenched by diluting with water to 200 mL, and purified by diafiltration using a 30,000 MWCO membrane. The concentrate was dried under a vacuum at 60)C. to give 80 mg of light brown solid (referred to hereinafter as polymer W). The polymer was characterized by IR, NMR, $^{31}$P NMR (PPM) 27.2.

EXAMPLE 24

(polymer X)

A water-soluble copolymer containing betadiphosphonic diacid and amide groups of the following structure:

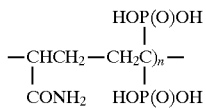

was prepared by copolymerization. The vinyl bisphosphonate (5.07 g, 16.9 mmole) was dissolved in trimethylbromosilane (20.7 g, 135.2 mmole) under argon. The reaction mixture was stirred at room temperature overnight. Excess trimethylbromosilane and other volatiles were removed under reduced pressure and the residual oil treated with 95% EtOH (15 mL). The mixture was stirred overnight at room temperature. Volatile materials were remover again under reduced pressure to give 3.0 g (90% yield) of pure vinyl bisphosphonic acid. Acrylamide (1.08g mg, 15.22 mmole), vinylbisphosphonic acid (500 mg, 2.72 mmole), and ammonium persulfate (34 mg, 1%) as a polymerization initiator were dissolved in 20 mL of deionized water. The mixture was stirred vigorously at 50°–55° C. for 40 hours and the solution remained clear throughout. The reaction was cooled to room temperature and diluted with deionized water to 50 mL. The polymer was purified by diafiltration using a 30,000 MWCO cartridge and collected 5 volume equivalents of permeate. The retentate was concentrated and dried in a vacuum oven at 60° C. A colorless polymer was obtained (700 mg) (referred to hereinafter as polymer X). Characterized by IR, NMR, $^{31}$P NMR (PPM).

EXAMPLE 25

(polymer Y)

A partially functionalized mercaptosuccinic acid containing water-soluble polymer of the following structure:

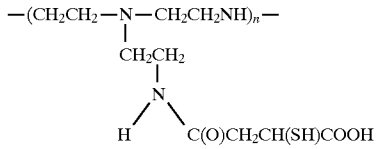

was prepared on polyethyleneimine. In a typical synthesis, 10.00 g (233 milliequivalents of PEI, prepurified as in example A, >30,000 MWCO) was dissolved in 200 mL water and the solution purged with argon for twenty minutes. Solid S-acetylmercaptosuccinic anhydride, 10.00 g (57.5 mmole), was added with stirring. After the solid disappeared, 10 g (94 mmole) of sodium carbonate was slowly added with care taken to ensure that the vigorous evolution of gas and resultant foaming did not cause an overflow. The solution was stirred overnight and then acidified to pH 4 with concentrated nitric acid. After purging with argon for twenty minutes, the solution was brought to pH 7 with sodium hydroxide. The slightly cloudy mixture was filtered through a fine, glass frit. The product was purified by diafiltration with at least five times as much millipore water as the final solution volume. Lyophilization of the retentate yielded the product (referred to hereinafter as polymer Y). Characterization: $^1$H and $^{13}$C NMR and IR.

Elemental analysis of 3 different batches: batch (1) C 42.57, H 7.19, N 12.85, S 9.17, S* 10.5; batch (2) C 42.78, H 7.09, N12.38, S 10.16, S* 8.4; batch (3) C 41.72, H 7.68, N 12.03, S 9.35, S* 8.2. S* Thiol sulfur content when analyzed by iodometric titration.

EXAMPLE 26

(polymer Z)

A partially functionalized ethyl thiol containing water-soluble polymer of the following structure:

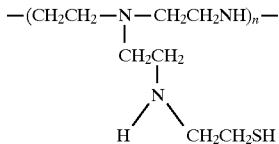

was prepared on polyethyleneimine. In a typical synthesis, 10.00 g (233 milliequivalents of PEI prepared as in Example A, 30,000 MWCO) was dissolved in 200 ml water and the pH was adjusted to 7 with concentrated HNO$_3$. The solution was purged with argon for twenty minutes and 3.45 mL (57.5 mmole) of ethylene sulfide was added with stirring. The biphasic mixture was stirred overnight and the slightly cloudy mixture was filtered through a fine, glass frit. The product was purified by diafiltration with at least five times as much millipore water as the final solution volume. Lyophilization of the retentate yielded 13.5 g of the product as a white powder (referred to hereinafter as polymer Z). Characterization: $^1$H and $^{13}$C NMR and IR.

EXAMPLE 27

(polymer AA)

A partially functionalized N-methylthiourea containing water-soluble polymer of the following structure:

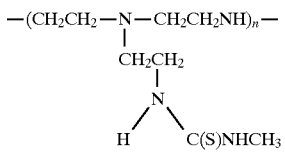

was prepared on polyethyleneimine. In a typical synthesis, 11.20 g (260 milliequivalents of PEI, prepared as in Example A, >30,000 MWCO) was dissolved in 200 ml of ethanol and the solution was purged with argon for twenty minutes. Methylisothiocyanate was warmed to 35° C. and 4.75 g (65.1 mmole) was mixed with 10 mL of ethanol. The isothiocyanate solution was added to the PEI at 0° C. and the solution was stirred one hour at which time a gooey precipitate formed. The solvent was removed via rotary evaporation and the product redissolved in 100 mL of water to which 5.86 mL of concentrated $HNO_3$ was added. After stirring overnight, the slightly cloudy mixture was filtered through a glass frit and the product was purified by diafiltration with at least five times as much millipore water as the final solution volume. Lyophilization of the retentate yielded 13.8 g of the product as a white powder (referred to hereinafter as polymer AA). Characterization—$^1H$ and $^{13}C$ NMR and IR.

EXAMPLE 28

(Polymer BB)

A phosphonic acid on a polyvinylamine backbone with the following structure:

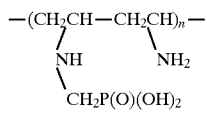

was prepared. A solution of formaldehyde (9.42 mL) was added dropwise during reflux over a period of 22 minutes to a solution of polyvinylamine (10 g) and phosphorus acid (19.04 g), in 3N HCl. After the addition was complete the solution was stirred at reflux for an additional hour. The heat was removed and cooled to room temperature. The solution was titrated to pH 6.8 with NaOH. The polymer was purified by diafiltration collecting five volume equivalents of permeate using hollow-fiber cartridges with a 30,000 MWCO. The bulk of the water was removed under reduced pressure. The residual material was dried in a vacuum oven at 60° C. overnight to give 18.21 g of a brittle yellow-orange solid (referred to hereinafter as polymer BB). UV/VIS: lambda max=296 nm. IR(ATR): 1628 $cm^{-1}$ (C=O).

EXAMPLE 29

(Polymer CC)

A thiolactam from polyvinylpyrrolidone with the structure:

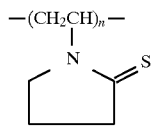

was prepared as follows. In an oven dried flask, nitrogen purged flask was placed 1.03 g (9.26 mmol) of polyvinylpyrrolidone (MW 40,000, Aldrich, used as received), 15 mL of dry chloroform and 2.00 g (9.0 mmol) of $P_2S_5$, phosphorous pentasulfide. The vessel was sealed and placed in an ultrasonic bath for 3 hours. After reaction the solution was centrifuged and the supernatant removed and evaporated under nitrogen. The gooey solid was then dried at 60° C. in a vacuum oven to give a crystalline product (0.78 g). The same reaction was performed with different proportions of $P_2S_5$ from a 2 fold excess to 1:1 to 0.5:1 ratios to give different levels of conversion of the lactam to the thiolactam. IR analysis of the dried polymers (referred to hereinafter as polymer O-2/1; polymer O-1/1; and polymer O-0.5/1) indeed gave three different levels of conversion with the excess $P_2S_5$ completely eliminating the carbonyl stretch between 1700 to 1800 $cm^{-1}$. The carbonyl peak was reduced proportionally with the 1:1 and 0.5:1 treatment.

EXAMPLE 30

A catechol-containing water-soluble polymer of the formula:

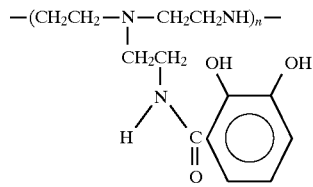

was prepared by the following procedure. 2,3-Dihydroxybenzoic acid (7.6 g, 50 mmole) was dissolved in thionyl chloride (25 mL). The solution was stirred at reflux for three hours. The excess thionyl chloride was removed under reduced pressure using a Dean Stark trap. The residue was sublimed under vacuum at 120° C. to yield 7.5 g (70%) of a white solid (melting point 84° C.).

In a reaction flask, polyethyleneimine (Polymin Waterfree, 2.50 g) was dissolved in tetrahydrofuran (35 mL). The acid chloride (3.17) was slowly added to the reaction flask resulting in the formation of a precipitate. The solution was stirred for one hour and the solvent removed under reduced pressure leaving a light brown solid. The solid was dissolved in water and adjusted to pH of 10.5 with potassium hydroxide followed by purification by ultrafiltration through a 30,000 MWCO cartridge to yield a reddish-brown solid upon removal of water under vacuum.

EXAMPLE 31

Copolymerization of vinyl bisphosphoric acid and acrylic acid was as follows. Vinyl bisphosphoric cyclohexylamine salt (0.64 g, 1.09 mmol), acrylic acid (0.44 g, 6.12 mmol) and ammonium persulfate (20 mg) were dissolved in deionized water (15 mL). The mixture was stirred vigorously at 50°–55° C. for 48 hours. The reaction was cooled to room temperature and diluted with deionized water to 50 ml. The polymer was purified by diafiltration using a 30,000 MWCO cartridge by collecting 5 volume equivalents of permeate (pH=6). The retentate (pH=5) was concentrated and dried under vacuum at 60° C. to yield 480 mg (30%) of the polymer as a white solid.

EXAMPLE 32

A 0.1 wt/vol % solution of the polymeric hydroxamic acid from example I, was prepared at each of the pH values 2, 6 and 8. Each solution was spiked with americium and filtered in a 10,000 MWCO ultrafiltration membrane. Almost no retention of the americium was observed at the lower pH values, but 99% retention was observed at the pH of 8. Thus, polymeric hydroxamic acid can bind an actinide such as americium under conditions of pH 8.

The other above described polymers also have utility in the selective separation of metal ion from solution, in the recovery of metals from solids and for the displacement of cyanide ions from metal-cyanide complexes and such descriptions have been incorporated by reference from the above mentioned concurrently filed patent applications.

Although the present invention has been described with reference to specific details, it is not intended that such details should be regarded as limitations upon the scope of the invention, except as and to the extent that they are included in the accompanying claims.

What is claimed is:

1. A synthetic water-soluble polymer having nitrogen, oxygen or sulfur containing-groups capable of binding metal ions, said water soluble polymer being the product of the process comprising:
   (1) providing a water-soluble polymer having nitrogen, oxygen or sulfur-containing groups capable of binding metal ions,
   (2) predetermining a molecular weight distribution within which said water-soluble polymer does not exhibit any detectable leakage during ultrafiltration with a preselected ultrafiltration membrane;
   (3) presizing said water-soluble polymer at a polymer concentration, pH and ionic strength effective to achieve said molecular weight range distribution.

2. A water-soluble polymer of claim 1 of the formula

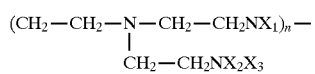 (i)

wherein $X_1$, $X_2$, and X3 in each unit of the polymer is a group independently selected from a substituent selected from H, $C(O)CH_2CH(SH)COOH$,

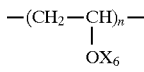

where when m is an integer selected from 0, 2, 3, or 4, Y is selected from P=O, C=S, $SO_2$, $C(O)CH_2C(O)$, or S, Z is selected from an amine, alkylamine, arylamine, hydroxyl, oxyalkyl, oxyaryl, hydroxylamine, alkylhydroxylamine, arylhydroxylamine, thiol, alkylthiol, alkyl, aryl, dimethylpyrazolone, methylphenylpyrazolone, dimethylpyrazol-thione, methylphenylpyrazol-thione, oxycrown ethers, azacrown ethers, thiocrown ethers, or H, and when m is 1, Y is selected from C=O, C=S, $SO_2$, $C(O)CH_2C(O)$, or S, Z is selected from an amine, alkylamine, arylamine, oxyalkyl, oxyaryl, hydroxylamine, alkylhydroxylamine, arylhydroxylamine, thiol, alkylthiol, alkyl, aryl, methylphenylpyrazolone, dimethylpyrazol-thione, methylphenylpyrazol-thione, oxycrown ethers, azacrown ethers, thiocrown ethers, or H, p is an integer from 1 to 2, and n is an integer between about 12 and 12,000; and

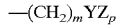

where m is an integer from 0 to 6, Y is selected from C=O, P=O, or C=S, $R_1$ and $R_2$ are selected from an amine, alkylamine, arylamine, hydroxyl, oxyalkyl, oxyaryl, hydroxylamine, alkylhydroxylamine, arylhydroxylamine, thiol, alkylthiol, alkyl, aryl, or H, p is an integer from 1 to 2, with the proviso that at least one of $X_1$, $X_2$, and X3 is not hydrogen;

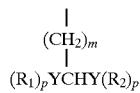 (ii)

wherein $X_4$ and $X_5$ in each unit of the polymer is a group independently selected from a substituent selected from H, $C(O)CH_2CH(SH)COOH$,

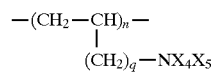

where q is an integer from 0 to 4, and where when m is an integer selected from 0, 2, 3, or 4, Y is selected from C=O, P=O, C=S, $SO_2$, $C(O)CH_2C(O)$, or S, Z is selected from an amine, alkylamine, arylamine, hydroxyl, oxyalkyl, oxyaryl, hydroxylamine, alkylhydroxylamine, arylhydroxylamine, thiol, alkylthiol, alkyl, aryl, dimethylpyrazolone, methylphenylpyrazolone, dimethylpyrazol-thione, methylphenylpyrazol-thione, oxycrown ethers, azacrown ethers, thiocrown ethers, or H, and when m is 1, Y is selected from C=O, C=S, $SO_2$, $C(O)CH_2C(O)$, or S, Z is selected from an amine, alkylamine, arylamine, oxyalkyl, oxyaryl, hydroxylamine, alkylhydroxylamine, arylhydroxylamine, thiol, alkylthiol, alkyl, aryl, dimethylpyrazolone, methylphenylpyrazolone, dimethylpyrazol-thione, methylphenylpyrazol-thione, oxycrown ethers, azacrown ethers, thiocrown ethers, or H, p is an integer from 1 to 2, and n is an integer between about 24 and 24,000 with the proviso that at least one Of $X_4$ and $X_5$ is not hydrogen;

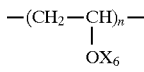 (iii)

wherein $X_6$, in each unit of the polymer is a group independently selected from a substituent selected from $C(O)CH_2CH(SH)COOH$,

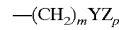

where when m is an integer selected from 0, 2, 3, or 4, Y is selected from C=O, P=O, C=S, $SO_2$, $C(O)CH_2C(O)$, or S, Z is selected from an amine, alkylamine, arylamine, hydroxyl, oxyalkyl, oxyaryl, hydroxylamine, alkylhydroxylamine, arylhydroxylamine, thiol, alkylthiol, alkyl, aryl, dimethylpyrazolone, methylphenylpyrazolone, dimethylpyrazol-thione, methylphenylpyrazol-thione, oxycrown ethers, azacrown ethers, thiocrown ethers, or H, and when m is 1, Y is selected from C=O, C=S, $SO_2$, $C(O)CH_2C(O)$, or S, Z is selected from an amine, alkylamine, arylamine, oxyalkyl, oxyaryl, hydroxylamine, alkylhydroxylamine, arylhydroxylamine, thiol, alkylthiol, alkyl, aryl, dimethylpyrazolone, methylphenylpyrazolone, dimethylpyrazol-thione, methylphenylpyrazol-thione, oxycrown ethers, azacrown ethers, thiocrown ethers, or H, p is an integer from 1 to 2, and n is an integer between about 24 and 24,000;

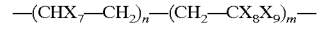 (iv)

wherein $X_7$, $X_8$, and $X_9$ in each unit of the polymer is a group independently selected from a substituent selected from $C(O)CH_2CH(SH)COOH$,

where when m is an integer selected from 0, 2, 3, or 4, Y is selected from C=O, P=O, C=S, $SO_2$, $C(O)CH_2C(O)$, or S, Z is selected from an amine, alkylamine, arylamine, hydroxyl, oxyalkyl, oxyaryl, hydroxylamine, alkylhydroxylamine, arylhydroxylamine, thiol, alkylthiol, alkyl, aryl, dimethylpyrazolone, methylphenylpyrazolone, dimethylpyrazol-thione, methylphenylpyrazol-thione, oxycrown ethers, azacrown ethers, thiocrown ethers, or H, and when m is 1, Y is selected from C=O, C=S, $SO_2$, $C(O)$ $CH_2C(O)$, or S, Z is selected from an amine, alkylamine, arylamine, oxyalkyl, oxyaryl, hydroxylamine, alkylhydroxylamine, arylhydroxylamine, thiol, alkylthiol, alkyl, aryl, dimethylpyrazolone, methylphenylpyrazolone, dimethylpyrazol-thione, methylphenylpyrazol-thione, oxycrown ethers, azacrown ethers, thiocrown ethers, or H, p is an integer from 1 to 2, and n is an integer between about 12 and 12,000; or

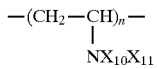 (v)

wherein $X_{10}$ and $X_{11}$ in each unit of the polymer are a thiolactum or are a group independently selected from a substituent selected from $C(O)CH_2CH(SH)COOH$, and

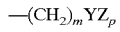

where m is an integer from 0 to 4, Y is selected from C=O, P=O, C=S, $SO_2$, $C(O)CH_2C(O)$, or S; Z is selected from an amine, alkylamine, arylamine, hydroxyl, oxyalkyl, oxyaryl, hydroxylamine, alkylhydroxylamine, arylhydroxylamine, thiol, alkylthiol, alkyl, aryl, dimethylpyrazolone, methylphenylpyrazolone, dimethylpyrazol-thione, methylphenylpyrazol-thione, oxycrown ethers, azacrown ethers, thiocrown ethers, or H, p is an integer from 1 to 2, and n is an integer between about 24 and 24,000.

3. A water-soluble polymer of claim 1 having nitrogen-, oxygen- or sulfur-containing groups capable of binding metal ions, said water-soluble polymer having sizes retained by a membrane with a molecular weight cutoff value of about 10,000 and characterized as essentially free of polymer sizes capable of passing through a membrane with a molecular weight cutoff value of about 10,000.

4. A water-soluble polymer of claim 1 having nitrogen-, oxygen- or sulfur-containing groups capable of binding metal ions, said water-soluble polymer having sizes retained by a membrane with a molecular weight cutoff value of about 30,000 and characterized as essentially free of polymer sizes capable of passing through a membrane with a molecular weight cutoff value of about 30,000.

5. A water-soluble polymer of claim 1 having nitrogen-, oxygen- or sulfur-containing groups capable of binding metal ions, said water-soluble polymer having sizes retained by a membrane with a molecular weight cutoff value of about 100,000 and characterized as essentially free of polymer sizes capable of passing through a membrane with a molecular weight cutoff value of about 100,000.

6. A water-soluble polymer of claim 1 having nitrogen-, oxygen- or sulfur-containing groups capable of binding metal ions, said water-soluble polymer having sizes retained by a membrane with a molecular weight cutoff value of about 10,000, but capable of passing through a membrane with a molecular weight cutoff value of about 30,000 and characterized as essentially free of polymer sizes capable of passing through a membrane with a molecular weight cutoff value of about 10,000 and polymer sizes retained by a membrane with a molecular weight cutoff value of about 30,000.

7. A water-soluble polymer of claim 1 having nitrogen-, oxygen- or sulfur-containing groups capable of binding metal ions, said water-soluble polymer having sizes retained by a membrane with a molecular weight cutoff value of about 10,000, but capable of passing through a membrane with a molecular weight cutoff value of about 100,000 and characterized as essentially free of polymer sizes capable of passing through a membrane with a molecular weight cutoff value of about 10,000 and polymer sizes retained by a membrane with a molecular weight cutoff value of about 100,000.

8. A water-soluble polymer of claim 1 having nitrogen-, oxygen- or sulfur-containing groups capable of binding metal ions, said water-soluble polymer having sizes retained by a membrane with a molecular weight cutoff value of about 30,000, but capable of passing through a membrane with a molecular weight cutoff value of about 100,000 and characterized as essentially free of polymer sizes capable of passing through a membrane with a molecular weight cutoff value of 30,000 and polymer sizes retained by a membrane with a molecular weight cutoff value of about 100,000.

9. The water-soluble polymer of claim 3 wherein said water-soluble polymer includes groups selected from the group consisting of carboxylic acid groups, phosphonic acid groups, acylpyrazolone groups, hydroxamic acid groups, aza crown ether groups, guanidinium groups, thiolactum groups, amide groups, permethylated polvinylpyridine groups, mercaptosuccinic acid groups, alkyl thiol groups, N-alkylthiourea groups, and catechol groups.

10. The water-soluble polymer of claim 3 wherein said water-soluble polymer is polyethyleneimine.

11. The water-soluble polymer of claim 4 wherein said water-soluble polymer includes groups selected from the group consisting of carboxylic acid groups, phosphonic acid groups, acylpyrazolone groups, hydroxamic acid groups, aza crown ether groups, guanidinium groups, thiolactum groups, amide groups, permethylated polvinylpyridine groups, mercaptosuccinic acid groups, alkyl thiol groups, N-alkylthiourea groups, and catechol groups.

12. The water-soluble polymer of claim 4 wherein said water-soluble polymer is polyethyleneimine.

13. The water-soluble polymer of claim 5 wherein said water-soluble polymer includes groups selected from the group consisting of carboxylic acid groups, phosphonic acid groups, acylpyrazolone groups, hydroxamic acid groups, aza crown ether groups, guanidinium groups, thiolactum groups, amide groups, permethylated polvinylpyridine groups, mercaptosuccinic acid groups, alkyl thiol groups, N-alkylthiourea groups, and catechol groups.

14. The water-soluble polymer of claim 5 herein said water-soluble polymer is polyethyleneimine.

15. The water-soluble polymer of claim 6 wherein said water-soluble polymer includes groups selected from the group consisting of carboxylic acid groups, phosphonic acid groups, acylpyrazolone groups, hydroxamic acid groups, aza crown ether groups, guanidinium groups, thiolactum groups, amide groups, permethylated polvinylpyridine groups, mercaptosuccinic acid groups, alkyl thiol groups, N-alkylthiourea groups, and catechol groups.

16. The water-soluble polymer of claim 6 wherein said water-soluble polymer is polyethyleneimine.

17. The water-soluble polymer of claim 7 wherein said water-soluble polymer includes groups selected from the group consisting of carboxylic acid groups, phosphonic acid groups, acylpyrazolone groups, hydroxamic acid groups, aza crown ether groups, guanidinium groups, thiolactum groups, amide groups, permethylated polvinylpyridine groups, mercaptosuccinic acid groups, alkyl thiol groups, N-alkylthiourea groups, and catechol groups.

18. The water-soluble polymer of claim 7 wherein said water-soluble polymer is polyethyleneimine.

19. The water-soluble polymer of claim 8 wherein said water-soluble polymer includes groups selected from the group consisting of carboxylic acid groups, phosphonic acid groups, acylpyrazolone groups, hydroxamic acid groups, aza crown ether groups, guanidinium groups, thiolactum groups, amide groups, permethylated polvinylpyridine groups, mercaptosuccinic acid groups, alkyl thiol groups, N-alkylthiourea groups, and catechol groups.

20. The water-soluble polymer of claim 8 wherein said water-soluble polymer is polyethyleneimine.
21. A water-soluble polymer of the formula
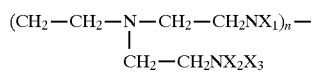   (i)
wherein $X_1$ and $X_2$ in each unit of the polymer are hydrogen, and $X_3$ in each unit of the polymer is $-(CH_2)_m YZ_p$ where m is 1, Y is C=O, Z is dimethylpyrazolone, p is 1, and n is an integer between about 12 and 12,000.
* * * * *